United States Patent [19]

Crane, Jr. et al.

[11] Patent Number: 4,810,233
[45] Date of Patent: Mar. 7, 1989

[54] INTERLOCKING UNIVERSAL JOINT SEAL ASSEMBLY

[75] Inventors: John J. Crane, Jr., Rockford; Larry G. Miller, German Valley, both of Ill.

[73] Assignee: Borg-Warner Corporation, Chicago, Ill.

[21] Appl. No.: 593,796

[22] Filed: Mar. 27, 1984

[51] Int. Cl.⁴ ............................ F16D 3/40; F16C 33/72
[52] U.S. Cl. ......................................... 464/131; 277/50; 384/484
[58] Field of Search .................. 277/47, 48, 49, 50, 277/84, 166; 308/187.1, 187.2; 464/11, 14, 128, 130, 131, 133, 136

[56] References Cited

U.S. PATENT DOCUMENTS

| | | | |
|---|---|---|---|
| 1,993,357 | 3/1935 | Braun et al. | 464/130 |
| 2,113,998 | 4/1938 | Swenson | 464/131 X |
| 2,209,855 | 7/1940 | Slaght | 464/131 |
| 2,285,623 | 6/1942 | Swenson et al. | 464/131 |
| 2,338,169 | 1/1944 | Dunn | 464/130 X |
| 2,773,366 | 12/1956 | Slaght | 464/131 |
| 2,802,351 | 8/1957 | Anderson | 464/131 X |
| 2,826,051 | 3/1958 | Halberg et al. | 464/131 X |
| 3,200,615 | 8/1965 | Stokely | 464/131 X |
| 3,479,840 | 11/1969 | Meyers | 464/131 |
| 3,858,413 | 1/1975 | Nemtsov et al. | 464/131 X |
| 3,940,948 | 3/1976 | Schultenkamper | 464/127 |
| 4,337,628 | 7/1982 | Greene | 464/131 |

FOREIGN PATENT DOCUMENTS

| | | | |
|---|---|---|---|
| 3115659 | 11/1982 | Fed. Rep. of Germany | 464/128 |
| 475465 | 6/1975 | U.S.S.R. | 464/14 |

Primary Examiner—Daniel P. Stodola
Attorney, Agent, or Firm—Leydig, Voit & Mayer

[57] ABSTRACT

An interlocking seal assembly for a universal joint which acts both to seal the bearing assembly as well as to retain the bearing block from falling off the spider in the joint. This assembly includes a resilient sealing member engaging a trunnion and having a backing ring housing the seal and adapted to be press fitted into the bearing block on the trunnion and a loose fitting generally cylindrical shield adapted to be press fitted onto a diameter of the spider. The backing ring and shield have overlapping lips providing the interlock to retain the bearing block on the spider.

2 Claims, 2 Drawing Sheets

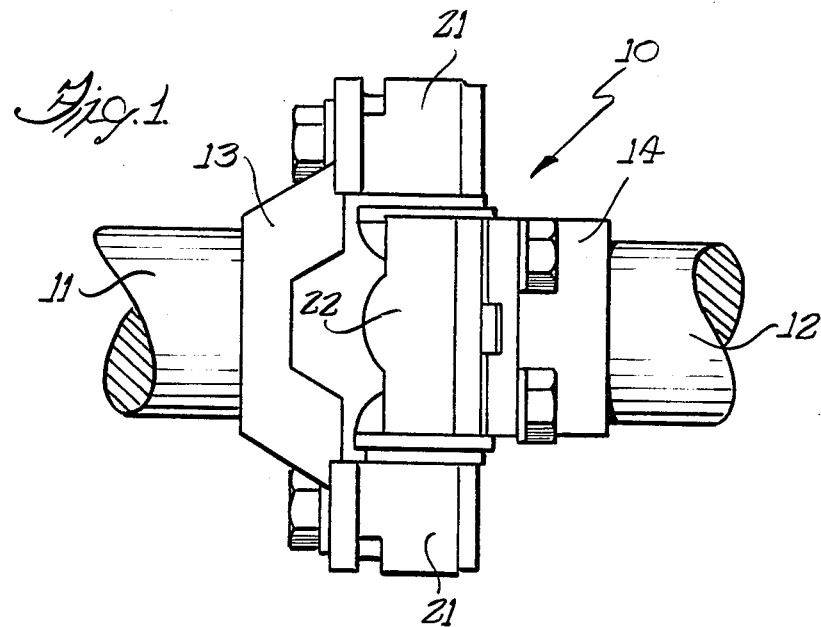
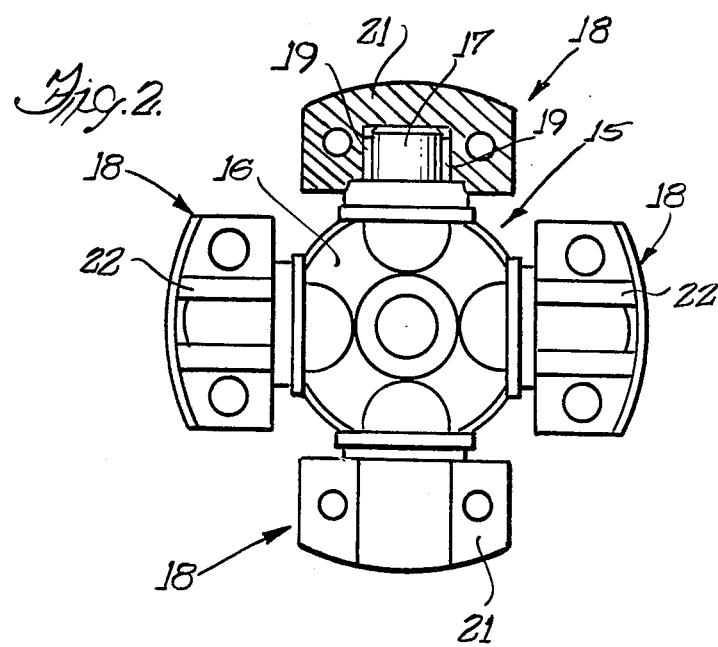

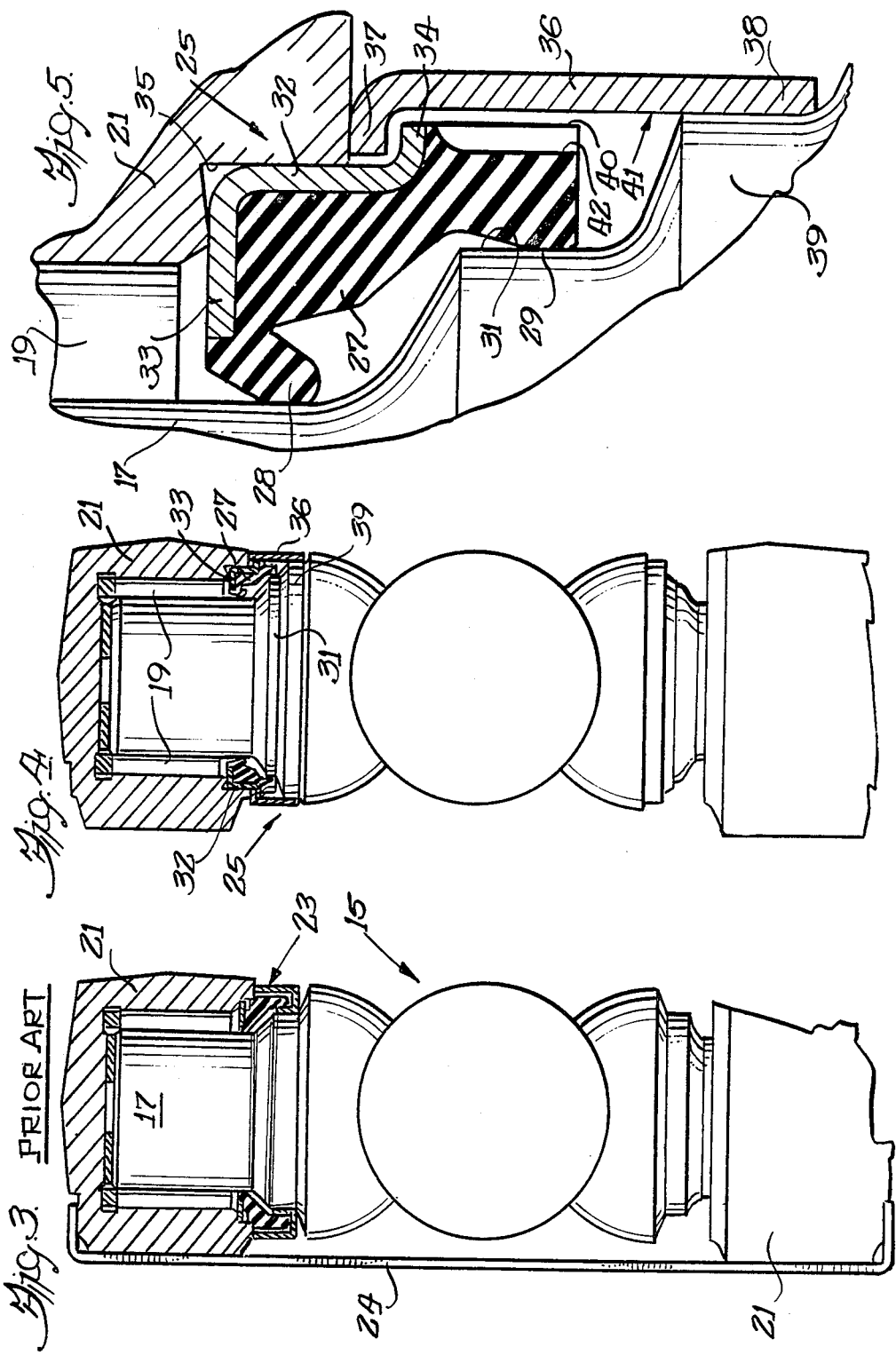

INTERLOCKING UNIVERSAL JOINT SEAL ASSEMBLY

BACKGROUND OF THE INVENTION

The present invention relates to a universal joint for use in automotive vehicles or heavy-duty equipment which must operate under severe environmental conditions. If excessive wear is to be prevented in use of the joint, the bearings forming a part of the joint must be adequately lubricated and protected from contamination by dirt or other foreign matter. Thus, adequate lubricant must be retained in the bearing area.

Also, it is well known that means must be used to keep the bearings from falling off of the spider during shipping and handling. Otherwise, if the bearing fell off the spider, the needle bearings could also drop off and cause trouble during reassembly and/or dirt could enter the bearing. To prevent this in the past, a wire was welded across the bearings to hold them onto the spiders.

It is further known that a rubber seal was necessary to retain lubricant in the bearing and exclude contamination and, as shown by tests, that a dust shield was required over the seal to keep abrasive material from impinging on the rubber sealing lip so the seal does not wear or ingest dirt into the seal around the lip due to oscillation of the joint. Therefore, a dust shield was pressed onto the spider to encompass and protect the resilient seal. However, prior seals developed to overcome these problems and prolong the operating life of the universal joint were not satisfactory because foreign matter entered the bearing area and resulted in an unacceptably high rate of wear. The present invention provides a sealing mechanism to overcome the above described problems in universal joint applications.

SUMMARY OF THE INVENTION

The present invention comprehends the provision of a novel interlocking seal assembly for a universal joint to effectively retain lubricant for and prevent contamination in the bearing area of the joint. The seal includes a generally annular resilient member secured in a backing ring and a dust shield loosely mounted on the backing ring. The backing ring has an outwardly extending lip at its inner edge cooperating with an inwardly extending lip on the outer edge of the dustshield to provide an interlocking assembly.

The present invention also comprehends the provision of a novel interlocking seal assembly for a universal joint to retain the parts together during shipping and handling. The backing ring for the resilient seal member is press fitted into a counterbore in a bearing on the joint trunnion and the dustshield is press fitted onto a shoulder diameter of the spider carrying the trunnions and bearings. The capture of the overlapping lips serves to hold the bearing on the spider.

Further objects of the invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is an elevational view of a universal joint utilizing the present invention.

FIG. 2 is an elevational view, partially in cross section of the spider assembly for the universal joint.

FIG. 3 is an elevational view partially in cross section showing a prior sealing and retaining means.

FIG. 4 is an elevational view similar to FIG. 3, but showing the interlocking seal assembly of the present invention.

FIG. 5 is an enlarged cross sectional view through the interlocking seal assembly.

DESCRIPTION OF THE PREFERRED EMBODIMENT

Referring more particularly to the disclosure in the drawings wherein is shown an illustrative embodiment of the present invention, FIG. 1 discloses a universal or cardan joint 10 interconnecting two rotatable shafts 11 and 12, one of which drives the other through the universal joint which includes a pair of yokes 13 and 14 suitably secured to the ends of the shafts 11 and 12, respectively.

As shown in FIG. 2, a spider 15 includes a central cross member 16 having four circumferentially equally spaced trunnions 17, on which are mounted four bearing assemblies 18; each bearing assembly comprising a bearing block 21 or 22 rotatably mounted on its associated trunnion 17 by a plurality of needle bearings 19. The yoke 13 is secured to a pair of oppositely disposed bearing blocks 21,21, while the yoke 14 is secured to the other pair of blocks 22,22 removed 90° from the first pair.

As seen in FIG. 3, in the past to prevent the inclusion of dust and/or other foreign contaminants, a resilient seal assembly 23 was located between each bearing block 21 and its respective trunnion 17, and an elongated wire 24 was welded across opposite bearing blocks 21 to hold them onto the spider 15 during shipping and handling before assembly onto the yokes. However, this was inefficient and ineffective, and the present invention overcomes these deficiencies.

As seen in FIGS. 4 and 5, an improved interlocking seal assembly 25 is utilized to retain the joint together before being secured to the yokes and to effectively preclude the entrance of dirt into the bearings. Also, this seal assembly allows better standardization of assemblies because right and lefthand kits are not required due to orientation of the grease fittings (not shown) in the cross member. The assembly includes a generally annular resilient seal ring 27 of an irregular L-shape having an outer interior sealing lip 28 engaging the trunnion 17 and an inner interior sealing lip 29 engaging a shouldered portion 31 of the spider. The resilient ring is recessed on its exterior top and side surfaces to conformably receive and is secured within a cylindrical cartridge or backing ring 32 having an inwardly extending flange 33 adjacent the inner ends of needle bearings 19 and an outwardly extending lip 34 adjacent the inner sealing lip 29. The backing ring 32 has an exterior diameter conformably received in a counterbore 35 at the inner end of the associated bearing block 21 or 22.

A generally cylindrical dust shield 36 has an interior diameter 41 of a dimension to loosely receive the lip 34 of the backing ring 32 with an inwardly extending flange or lip 37 at its outer end cooperating with the backing ring lip 32 to interlock the members together. Also, the interior diameter of the shield at the open end 38 is of a diameter to conformably receive a shoulder 39 of the spider spaced radially inwardly of the shouldered portion 31 engaged by the sealing lip 29.

The interlocking seal is assembled and functions as follows: the dust shield 36 is assembled loosely on the backing ring 32 of the resilient seal ring 27, and this entire assembly is pressed into the bore 35 in the bearing block 21, with the backing ring 21 frictionally engaging the bearing block and the flange 33 retaining the needle bearings 19 in operative position. The bearing seal and shield and associated bearing block 21 are then slid onto the trunnion 17 and spider 15; the shield 36 being pushed by the bearing block 21 onto the press diameter of the shoulder 39 of the spider. The press fit in the bore 35 and on the shoulder 39 and the capture between the lips 34 and 37 serve to provide the function of holding the bearing on the spider. It is important that the shield 36 be pressed on with the bearing since this will automatically provide a very narrow assembled gap to preclude the entrance of dirt. This gap when the spider is assembled in yokes provides sufficient opening to allow grease to be purged through the bearings at the time of relubrication.

In order to maximize the performance of the sealing mechanism, it is necessary to minimize the dimension between the outside diameter 40 of the seal ring 27 and the major inside diameter 41 of the dust shield 36. The seal ring features three equally spaced axially extending grooves 42 on the seal exterior diameter. These grooves prevent a hydraulic lock from occurring between the seal exterior diameter and the dust shield 36, which would otherwise cause permanent damage to the seal mechanism.

We claim:

1. A universal joint including a spider having at least one trunnion, each trunnion being journalled by bearing elements in a bearing block, the improvement comprising an interlocking seal assembly including a generally cylindrical backing ring secured within said bearing block and retaining said bearing elements therein, said ring having an inward flange at one end adjacent said bearing elements and an outwardly extending lip on the opposite end thereof, a generally cylindrical dust shield encompassing at least a portion of said backing ring and secured onto said spider, a resilient seal element recessed on its exterior surface to conformably receive said backing ring and having a first sealing lip engaging said trunnion and an axially spaced second sealing lip engaging said spider, and means interlocking said backing ring and dust shield including an inward lip on said shield positioned between said ring lip and bearing block, said seal element extending axially inwardly of said backing ring and having a plurality of axially extending equally spaced grooves in the exterior surface thereof.

2. A universal joint as set forth in claim 1, in which the external diameter of said seal element is equal to the external diameter of said backing ring outwardly extending lip.

* * * * *